R. S. JENNINGS,
Assignor to J. LEVERING and G. O. MANNING, Trustees.
PACKING CASE.
No. 10,182. Reissued Aug. 15, 1882.
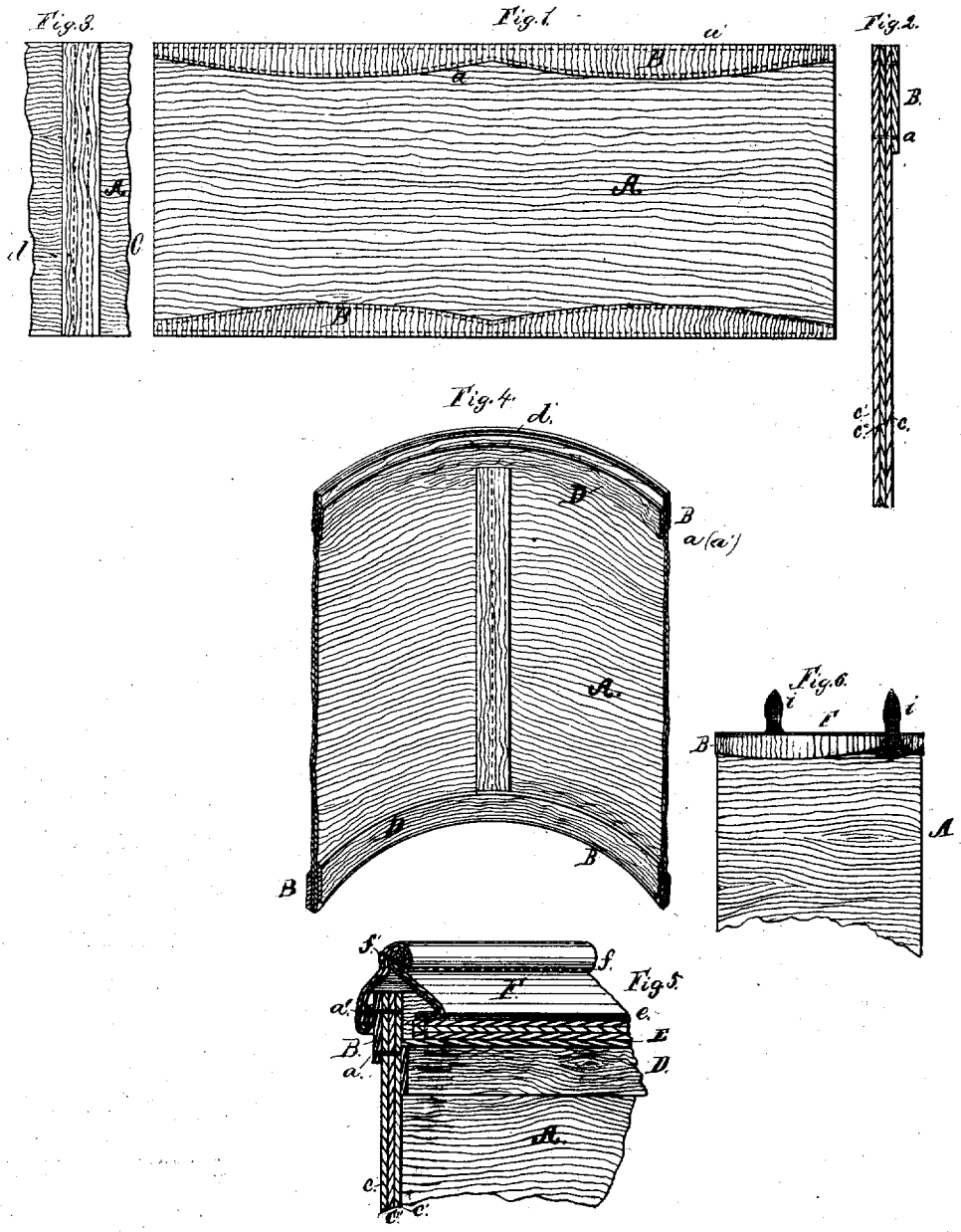
WITNESSES
A. G. Dyhman.
S. S. Kane,
By his Attorney
INVENTOR
Ralph S. Jennings
E. M. Johnson

UNITED STATES PATENT OFFICE.

RALPH S. JENNINGS, OF BALTIMORE, ASSIGNOR TO JOSHUA LEVERING, OF BALTIMORE, AND GEORGE O. MANNING, OF BALTIMORE COUNTY, MARYLAND, TRUSTEES; SAID TRUSTEES ASSIGNORS TO THE FLEXIBLE WOOD PACKAGE COMPANY, OF BALTIMORE, MARYLAND.

PACKING-CASE.

SPECIFICATION forming part of Reissued Letters Patent No. 10,182, dated August 15, 1882.

Original No. 237,874, dated February 15, 1881. Application for reissue filed March 11, 1882.

*To all whom it may concern:*

Be it known that I, RALPH S. JENNINGS, a citizen of the United States of America, residing at Baltimore, in the county of Baltimore and State of Maryland, have invented certain new and useful Improvements in Packing-Cases, of which the following is a specification, reference being had therein to the accompanying drawings, in which—

Figure 1 is a side elevation of the body-blank. Fig. 2 is a vertical sectional view of the edge of the body on an enlarged scale, showing the direction of the grain of the wood. Fig. 3 is a side elevation of the interior side of the longitudinal seam. Fig. 4 is a perspective view of the interior of the case. Fig. 5 is a sectional view of the head-joint, and Fig. 6 is a side elevation of one end of the case.

My invention relates to packing-cases in general, but more particularly to such as are designed to contain pulverulent material; and it has for its object to provide a case which, by reason of its strength, toughness, cheapness, and pliability, is adapted to subserve the ends of bagging or plank cases, and which, by reason of its imperviousness to water, is fitted for many uses for which barrels have heretofore been deemed necessary.

The above characteristics render the case of such almost universal availability as to make mention of the uses to which it may be put unnecessary. It is mainly designed, however, for packing fertilizers, which in the case of so-called "superphosphates" or "acid phosphates" are so corrosive in their action as to speedily rot and spoil the bagging in which they are packed. This prevents them from being kept for any great length of time in the bags. In the case of Peruvian guano or other fertilizing compounds consisting wholly or in part of the deposits from the guano islands or bat-caves, the odor of the material is so pungent and offensive that a practically air and water tight and acid-proof packing-case has long been a desideratum. I have succeeded in constructing a strong water-tight and acid-proof packing-case at a figure which will admit of its use in packing even cheaper material than fertilizers.

In the drawings, A is the body of the packing-case, which consists of two or more (preferably three) layers of veneer, *c c′ c″*, the outer and inner layers having the grain horizontal, while that of the middle layer is vertical. They are cemented together by means of any suitable cement, a composition of about eleven parts of pitch to one of dead-oil answering well. The longitudinal or side seam, *d*, (see Fig. 3,) is secured by corrodible stitches, and the heads are attached to the walls by means of strips of bagging or burlap F, which are secured by stitching *a′* with the thread to the edges of both the walls and the heads, and are overseamed, as shown at *f*. The stitching *a′* is liable, by reason of the close contiguity of the needle-holes, to cause the veneers on the outer and inner sides of the walls A to split—a result which is conduced by the approximate parallelism of the grain of the veneers to the line of stitching, both being substantially horizontal. To obviate this I stitch (as at *a*) or cement to the outer walls a strip, B, of veneer having the grain vertical or inclined, and in case it is stitched I make its lower edge curved or scalloped, or sinuous in outline, so that the stitches, which are parallel to its edge, cross the grain of the inner and outer layers, *c′ c*, and splitting of the same is prevented and the chine of the case is strengthened.

The burlap F is waterproofed by making it double and interposing a layer, *f′*, of pitch and dead-oil or other water-proof composition. To protect the thread-stitches on the inside from the corrosive action of the contents of the packing-case, I cover the longitudinal seam *d* with a strip of veneer or other suitable material, C, and spring a veneer hoop, D, around the inside, near the heads, and over the line or lines of stitches. The heads themselves are lined with a sheet, E, of veneer, which covers the open joint between the heads and body. (See Fig. 5.)

To facilitate the handling of the package or packing-case, I secure, by stitching or sewing to the body at opposite points, near its edge, as shown, the ears *i i*, of burlap or bagging material. It will be seen that the package is lined inside with wood and with wood alone— no stitches being unportected or exposed to the contents of the packing-case—and that the heads are secured to the walls by a waterproof joint.

No claim is herein laid to the mode of attaching the heads—namely, by a sheet or flap of textile fabric covering the open joint between the heads and body—as that is the subject of another application for Letters Patent.

What I claim is—

1. A composite veneer body for a packing-case, having the grain of its exterior layer horizontal, and having a re-enforcing strip surrounding its edge, and a textile-fabric flap stitched to said body and strip, substantially as described, and for the purpose set forth.

2. A composite veneer body for a packing-case, having the grain of its exterior layer horizontal, and having a re-enforcing strip secured around the edge of the body, the said strip having its grain vertical and being secured to the body by a line of stitches, substantially as set forth.

3. A ~veneer~ packing-case having seams with corrodible stitches protected from the access thereto of the contents of the package by means of non-corrodible material, substantially as described.

4. A veneer packing-case having stitched seams protected from the access thereto of the contents of the package by means of the strips of veneer C D, substantially as set forth.

5. The packing-case herein described, having an open joint between its head and body, which parts are united by a sheet or flap of textile fabric stitched to both and waterproofed, and a layer of veneer covering the said open joint, substantially as set forth.

6. A packing-case consisting of a pliable veneer body, to which the heads are united by textile fabric secured to the heads and to the body by stitches, and provided with independent flexible handles stitched to the body of the packing-case, substantially as shown and described.

In testimony whereof I affix my signature in presence of two witnesses.

RALPH S. JENNINGS.

Witnesses:
WM. B. S. GAY,
W. H. MEARS.